United States Patent
Santana De Oliveira et al.

(10) Patent No.: US 12,443,850 B2
(45) Date of Patent: Oct. 14, 2025

(54) TRAINABLE DIFFERENTIAL PRIVACY FOR MACHINE LEARNING

(71) Applicant: SAP SE, Walldorf (DE)

(72) Inventors: Anderson Santana De Oliveira, Antibes (FR); Caelin Kaplan, Nice (FR)

(73) Assignee: SAP SE, Walldorf (DE)

( * ) Notice: Subject to any disclaimer, the term of this patent is extended or adjusted under 35 U.S.C. 154(b) by 1008 days.

(21) Appl. No.: 17/379,310

(22) Filed: Jul. 19, 2021

(65) Prior Publication Data

US 2023/0019779 A1    Jan. 19, 2023

(51) Int. Cl.
*G06N 3/08* (2023.01)
*G06N 3/04* (2023.01)
*G06N 3/045* (2023.01)
*G06N 3/084* (2023.01)
*G06N 3/088* (2023.01)
*G06N 5/04* (2023.01)

(52) U.S. Cl.
CPC .............. *G06N 3/084* (2013.01); *G06N 3/045* (2023.01); *G06N 3/088* (2013.01); *G06N 5/04* (2013.01)

(58) Field of Classification Search
CPC ........ G06N 3/084; G06N 3/045; G06N 3/088; G06N 5/04; G06N 3/047; G06N 3/094; G06N 5/01; G06N 3/0475; G06F 21/6245
See application file for complete search history.

(56) References Cited

U.S. PATENT DOCUMENTS

2019/0370608 A1* 12/2019 Lee .................. G06N 3/084
2020/0311540 A1* 10/2020 Chakraborty ............ G06N 3/08

OTHER PUBLICATIONS

J. Brownlee, "How to Develop a Conditional GAN (cGAN) From Scratch," Sep. 1, 2020, MachineLearningMastery.com (Year: 2020).*
J. Brownlee, "How to Develop an Auxiliary Classifier GAN (AC-GAN) From Scratch with Keras," Jan. 18, 2021, MachineLearningMastery.com (Year: 2021).*

(Continued)

*Primary Examiner* — Van C Mang
(74) *Attorney, Agent, or Firm* — Klarquist Sparkman, LLP

(57) ABSTRACT

Technologies are provided for training machine learning models using a differential privacy mechanism. Training data can be transformed using a differential privacy mechanism that comprises a trainable confidence parameter. The transformed training data can be used to generate class predictions using the machine learning model. A class prediction loss can be determined based on differences between the class predictions and actual classes for the training data. A membership inference loss can also be determined based on predictions that example records in the transformed data set are actual members of the original training data. The membership inference loss and the class prediction loss can be combined to generate a classifier loss that can be used to update the machine learning model and to update the trainable confidence parameter of the differential privacy mechanism. The training can be repeated multiple times until the combined classifier loss falls below a specified threshold.

18 Claims, 8 Drawing Sheets

(56) References Cited

OTHER PUBLICATIONS

M. Du, K. Wang, Z. Xia and Y. Zhang, "Differential Privacy Preserving of Training Model in Wireless Big Data with Edge Computing," in IEEE Transactions on Big Data, vol. 6, No. 2, pp. 283-295, Jun. 1, 2020, doi: 10.1109/TBDATA.2018.2829886. (Year: 2020).*

N. Phan, X. Wu, H. Hu and D. Dou, "Adaptive Laplace Mechanism: Differential Privacy Preservation in Deep Learning," 2017 IEEE International Conference on Data Mining (ICDM), New Orleans, LA, USA, 2017, pp. 385-394, doi: 10.1109/ICDM.2017.48. (Year: 2017).*

Reza Shokri and Vitaly Shmatikov. 2015. Privacy-Preserving Deep Learning. In Proceedings of the 22nd ACM SIGSAC Conference on Computer and Communications Security (CCS '15). Association for Computing Machinery, New York, NY, USA, 1310-1321. https://doi.org/10.1145/2810103.2813687 (Year: 2015).*

Jia et al. "MemGuard: Defending against Black-Box Membership Inference Attacks via Adversarial Examples" (Year: 2019).*

Narayanan and Shmatikov, Robust De-anonymization of Large Datasets, *Proc IEEE Security & Privacy Conference*, pp. 111-125 (2008).

Sweeney, Weaving Technology and Policy Together to Maintain Confidentiality, *J Law Med Ethics*, 25:98-9110 (1997).

Barbaro and Zeller, A Face Is Exposed for AOL Searcher No. 4417749, *New York Times* (2006).

Abadi et al., Deep Learning with Differential Privacy, *Proceedings of the 2016 ACM SIGSAC Conference on Computer and Communications Security*, pp. 308-318 (Oct. 2016).

Dwork, Differential privacy: A Survey of Results, *International Conference on Theory and Applications of Models of Computation*, pp. 1-19. Springer, Berlin, Heidelberg (Apr. 2008).

Dwork and Roth, The Algorithmic Foundations of Differential Privacy, *Foundations and Trends in Theoretical Computer Science*, 9(3-4), 211-407 (2014).

Goodfellow et al., Generative Adversarial Nets. *Proceedings of NIPS*, pp. 2672-2680 (2014) (papers.nips.cc/paper/5423-generativeadversarial-nets.pdf).

Shokri et al., Membership Inference Attacks Against Machine Learning Models, *2017 IEEE Symposium on Security and Privacy (SP)*, pp. 3-18 (May 2017) (https://doi.org/10.1109/SP.2017.41).

Hilprecht et al., Monte Carlo and Reconstruction Membership Inference Attacks Against Generative Models, *Proceedings on Privacy Enhancing Technologies*, (4):232-249 (2019) (https://petsymposium.org/2019/files/papers/issue4/popets-2019-0067.pdf).

Frigerio et al., Differentially Private Generative Adversarial Networks for Time Series, Continuous, and Discrete Open Data, *IFIP International Conference on ICT Systems Security and Privacy Protection*, pp. 151-164. Springer, Cham (Jun. 2019).

Nasr et al., Comprehensive Privacy Analysis of Deep Learning: Passive and Active White-box Inference Attacks Against Centralized and Federated Learning, *2019 IEEE Symposium on Security and Privacy (SP)*, IEEE (2019).

Bernau et al. Assessing Differentially Private Deep Learning with Membership Inference, *arXiv preprint* arXiv:1912.11328 (2019).

Papernot et al., Semi-supervised Knowledge Transfer for Deep Learning from Private Training Data, *arXiv preprint* arXiv:1610.05755 (2016).

Nasr et al., Machine Learning with Membership Privacy Using Adversarial Regularization, *Proceedings of the 2018 ACM SIGSAC Conference on Computer and Communications Security* (2018).

Odena et al., Conditional Image Synthesis with Auxiliary Classifier GANs, *Proceeding of the 34th International Conference on Machine Learning* (2017).

Kingma and Welling, Auto-encoding Variational Bayes, *arXiv preprint* arXiv:1312.6114 (2013).

European Search Report received in related European Application No. 21211266.8, May 24, 2022, 7 pages.

Choquette-Choo et al., "Label-Only Membership Inference Attacks," Arix.org, Cornell University Library, 201 Olin Library Cornell University, Ithaca, NY 14853, Jan. 22, 2021, 19 pages.

Communication pursuant to Article 94(3) EPC, European Patent Application No. 21 211 266.8, 11 pages, Apr. 3, 2025.

Communication pursuant to Article 94(3) EPC, European Patent Application No. 21211266.8, 21 pages, Aug. 27, 2025.

* cited by examiner

TRAINABLE DIFFERENTIAL PRIVACY FOR MACHINE LEARNING

BACKGROUND

Recent developments in machine learning have been fueled by the availability of vast amounts of data for use in training machine learning models. However, in some cases, this data contains sensitive personal information that needs to be kept private. Even when the output of a machine learning model does not include training data, in some scenarios it is possible to infer the inclusion of certain data items in the data that was used to train the machine learning model. This leakage of sensitive information is referred to as membership inference. In situations where the internal model parameters are accessible, such as when a model exists on a third-party computing device, leakage of sensitive information through membership inference can become an even stronger possibility.

Differential privacy can be used in some cases to anonymize training data in order to make membership inference more difficult. However, it can be difficult to determine parameters for a differentially private mechanism that will protect the privacy of the training data and, at the same time, provide a sufficient level of utility in the machine learning model trained with the anonymized data. This is often a time-consuming and labor-intensive manual process.

Therefore, there is room for improvement in technologies for developing differential privacy mechanisms for use in conjunction with training machine learning models.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a computer-implemented method comprises training a machine learning model, wherein training the machine learning model comprises: transforming training data using a differential privacy mechanism; determining a classifier loss of the machine learning model using the transformed training data, wherein the classifier loss comprises a class prediction loss and a membership inference loss; updating a classifier of the machine learning model using the classifier loss; and updating a confidence parameter of the differential privacy mechanism using classifier loss.

In another example embodiment, a system comprises a computing device comprising a processor and a memory storing instructions that, when executed by the processor, cause the computing device to perform operations, the operations comprising: receiving training data; transforming the training data using a differential privacy mechanism; determining a classifier loss for a machine learning model using the transformed training data, wherein the classifier loss comprises a class prediction loss and a membership inference loss; using the classifier loss to update a classifier of the machine learning model; and using the classifier loss to update a confidence parameter of the differential privacy mechanism.

In another example embodiment, one or more computer-readable storage media storing instructions that, when executed by one or more processors, cause the one or more processors to perform operations, wherein the operations comprise training a machine learning model, wherein the machine learning model comprises a neural network, and training the machine learning model comprises: transforming training data using a differential privacy mechanism, wherein the differential privacy mechanism comprises a layer of the neural network and transforming the training data comprises combining a confidence parameter with a sample from a Laplace distribution; determining a classifier loss of the machine learning model using the transformed training data, wherein the classifier loss comprises a class prediction loss and a membership inference loss; updating a classifier of the machine learning model using the classifier loss, wherein the classifier comprises another one or more layers of the neural network; and updating the confidence parameter of the differential privacy mechanism using the classifier loss, wherein the updating comprises performing a backpropagation of the neural network.

As described herein, a variety of other features and advantages can be incorporated into the technologies as desired.

DETAILED DESCRIPTION

Example 1—Overview

Figure 1:
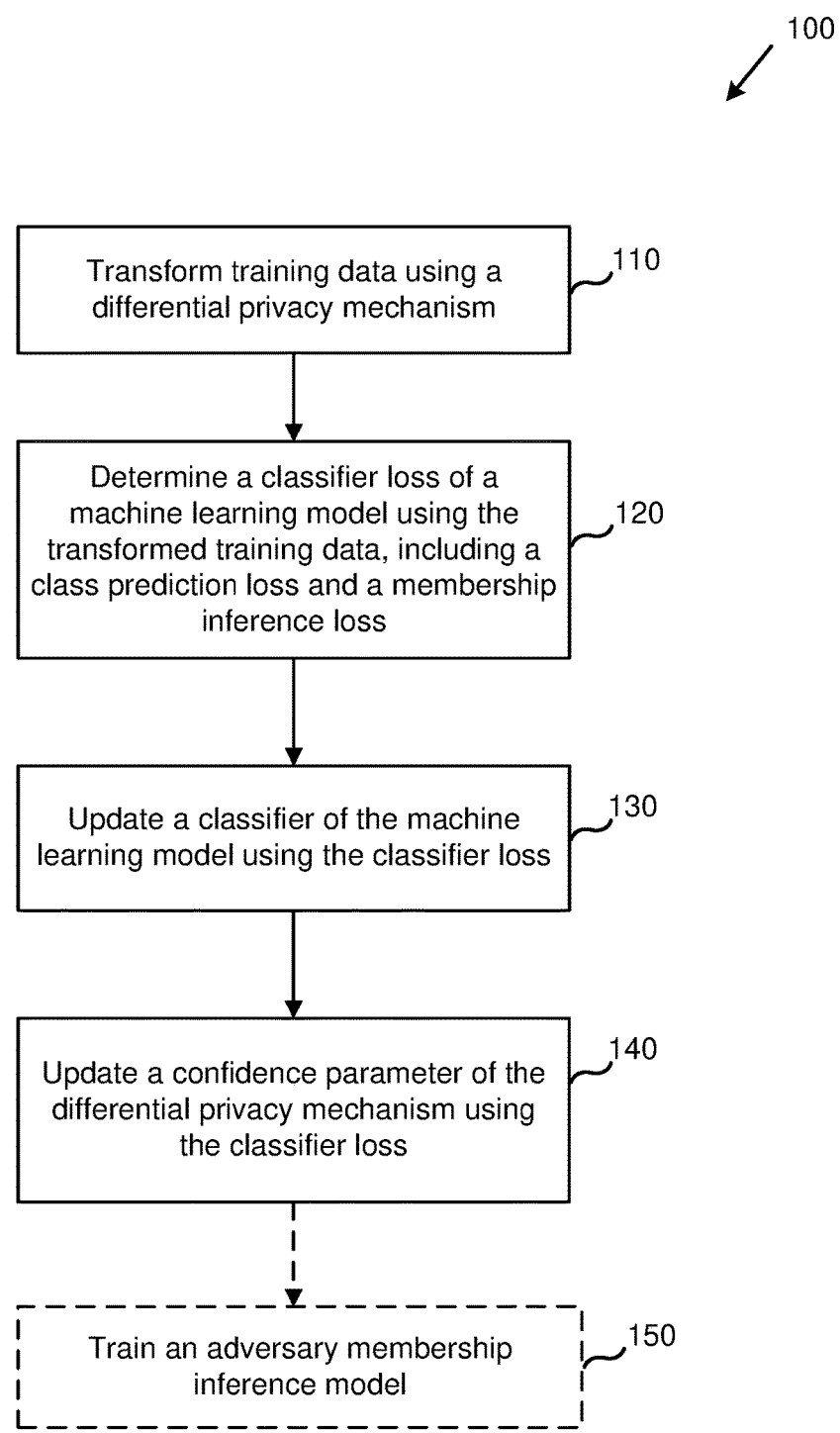
FIG. 1 is a flowchart of an example method for training a machine learning model using a differential privacy mechanism.

The description provided herein is directed to various technologies for incorporating trainable differential privacy mechanisms into machine learning training processes.

Differential privacy techniques can be used to protect against membership inference attacks. In some scenarios, differential privacy mechanism have been applied to guard against membership inference attacks that attempt to determine the presence of particular records in data sets that have been used to train machine learning models. However, creation of such differential privacy mechanisms remains a time-consuming manual process.

At least some of the embodiments disclosed herein address these problems by incorporating a trainable differential privacy mechanism into a machine learning training process. Training data can be transformed using a differential privacy mechanism that comprises a trainable confidence parameter. The transformed training data can be used to generate class predictions using the machine learning model. A class prediction loss can be determined based on differences between the class predictions and actual classes for the training data. A membership inference loss can also be determined based on predictions that example records in the transformed data set are actual members of the original training data. The membership inference loss and the class prediction loss can be combined to generate a classifier loss that can be used to update the machine learning model and to update the trainable confidence parameter of the differential privacy mechanism. The training can be repeated multiple times until the combined classifier loss falls below a specified threshold. For example, training can conclude when a minimum possible privacy budget has been expended to guard against membership inference, while still maintaining a desired level of utility in the machine learning model.

In at least some scenarios, incorporating trainable differential privacy mechanisms into the machine learning training process can result in maximum utility for machine learning tasks and maximum privacy without the need for human tuning of the differential privacy mechanism. In at least some cases, this can result in significant reductions of time and effort while also ensuring optimal utility and privacy characteristics for the machine learning model.

Example 2—Example Differential Privacy Mechanisms

In any of the examples described herein, a differential privacy mechanism is a mechanism that transforms a given data set into another data set that sufficiently differs from the given data set in order to satisfy privacy requirements, while containing sufficient similarities to the given data set to make it an acceptable substitute for processing and analysis. Differential privacy defines a constraint on a processing of data such that an output of two data sets are approximately the same while ensuring that an addition of a single record to a given data set does not render it distinguishable from a data set without the record.

More formally, a randomized algorithm M gives ($\varepsilon$, $\delta$)—differential privacy if for all databases $X_1$ and $X_2$ differing on at most one element, and all $S \subseteq Range(M)$, $Pr[M(X_1) \in S] \leq exp(\varepsilon) \times Pr[M(X_2) \in S] + \delta$, where $\varepsilon$ is a confidence parameter, which can also be referred to as a privacy budget, and $\delta$ is a value less than an inverse of any polynomial in the size of the database. As the confidence parameter $\varepsilon$ decreases, the output of the differential privacy mechanism becomes more private. However, this decrease in $\varepsilon$ may be accompanied by a decrease in the transformed data set's suitability as an analytical equivalent of the original data set.

Example 3—Example Membership Inference

In any of the examples described herein, membership inference comprises an attempt to determine whether a given record is part of a data set that was used to train a machine learning model.

Membership inference processes attempt to evaluate a degree to which a machine learning model behaves differently when an input sample is part of the training set, rather than from a set of non-training data that is a part of a same population. In order to determine whether a record was part of the training set or not, a membership inference process can be used to evaluate whether the model is putting the privacy of the training data at risk. There are two categories of membership inference processes: black-box and white-box. A black-box inference refers to a scenario where the membership inference process only has access to the input to the machine learning model and the output of the machine learning model. Alternatively, a white-box inference refers to the case when the membership inference process has access to internal features of the machine learning model (such as the observed losses, gradients, and learned weights) in addition to the inputs and outputs.

An adversarial training procedure can be used to improve a model's protection from membership inference attacks. Two machine learning models (such as two neural networks) can be trained in an adversarial fashion. The first machine learning model can be referred to simply as the machine learning model and the second machine learning model can be referred to as the adversary. A membership inference loss can be determined that quantifies an effectiveness of an adversary at performing a membership inference predictions based on inputs and outputs of the machine learning model. At each training iteration, weights of the machine learning model can be updated while the adversary's weights remain fixed, with the goal of minimizing the adversary's membership inference loss term. Subsequently, the weights of the adversary can be update while the machine learning model's weights remain fixed, with the goal of maximizing the membership inference accuracy. This training procedure can produce a minmax game that converges to a Nash equilibrium where, for a given data set, the machine learning model provides a highest possible level of privacy against the best possible adversary.

While membership inference privacy may be effective in the case of black-box membership inference attacks, such as those levied against machine learning as a service platforms, it may be less effective at protecting a machine learning model against white-box attacks. Furthermore, there is no formal guarantee of the privacy that the training procedure provides. Thus, membership inference privacy lacks the formal guarantees that differential privacy provides. With the inclusion of differential privacy, the model can be protected against both black-box and white-box membership inference attacks, and can also provide some measure of defense against an attacker poisoning the training data.

Example 4—Example Systems and Methods for Trainable Differential Privacy for Machine Learning In any of the examples described herein, systems and methods can be provided for . . . .

FIG. 1 is a flowchart of an example method 100 for training a machine learning model using a differential privacy mechanism. Any of the example systems described herein can be used to perform all or part of the example method 100. For example, the example system 200, depicted in FIG. 200, can be used to perform all or part of the example method 100.

Figure 2:
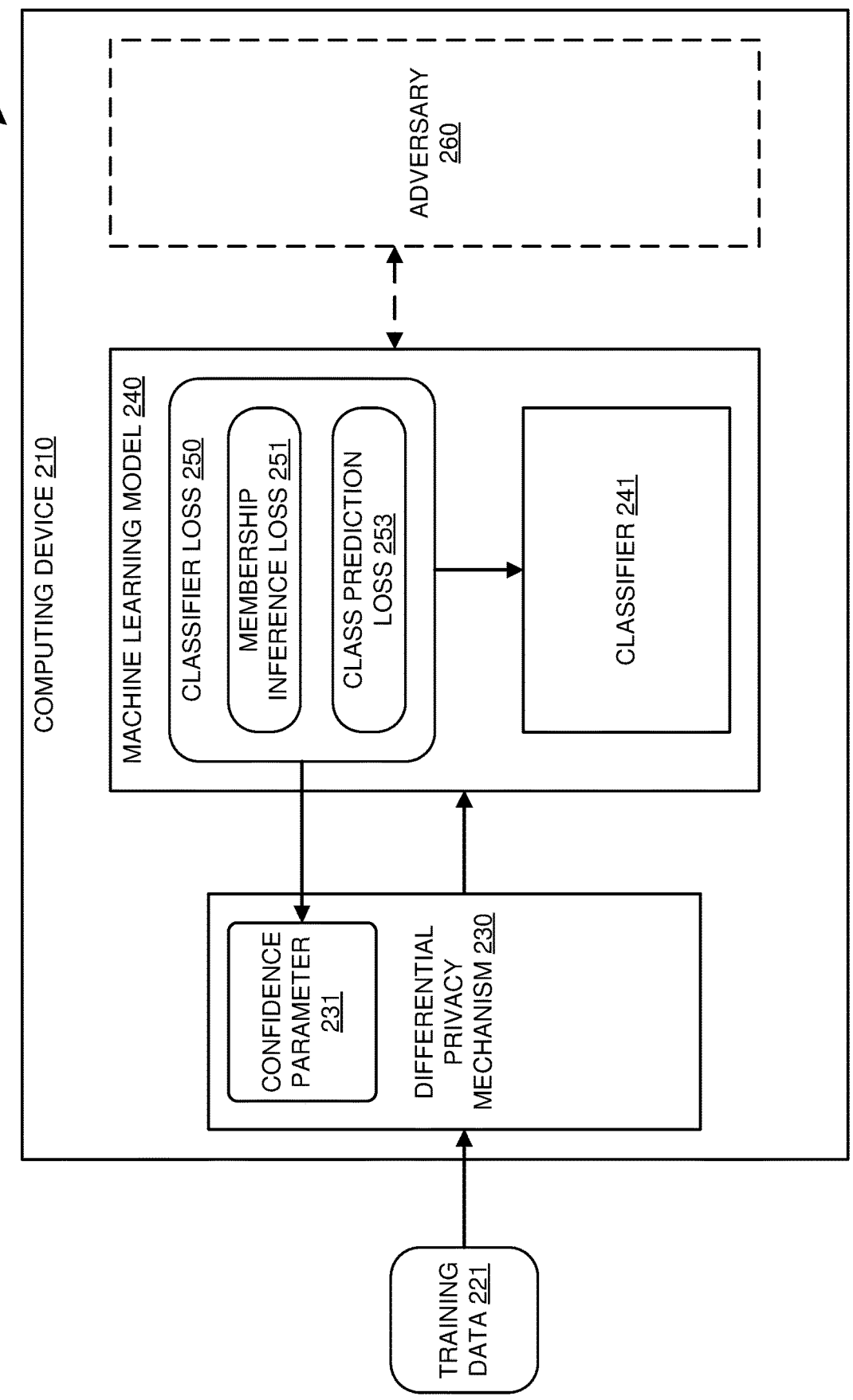
FIG. 2 is a system diagram depicting an example system for training a machine learning model using a differential privacy mechanism.

FIG. 2 is a system diagram depicting an example system 200 for training a machine learning model using a differential privacy mechanism. The example system 200 comprises a computing device 210. The computing device 210 can comprise one or more processors and one or more memories storing instructions that, when executed by the one or more processors, cause the computing device 210 to perform operations as described herein. Additionally or alternatively, the computing device can comprise one or more hardware components (such as application-specific integrated circuits (ASICs), field programmable gate arrays (FPGAs), etc.) configured to perform all or part of the operations described herein.

At 110, training data is transformed using a differential privacy mechanism. For example, the computing device 210 can receive training data 221 and can transform it using a differential privacy mechanism 230. The differential privacy mechanism 230 can comprise a confidence parameter 231. Transforming the training data can comprise combining the confidence parameter 231 with one or more samples from a distribution, such as a fixed distribution. The combination of the confidence parameter 231 and a sample from the distribution can be performed in order to produce an outcome that is equivalent to sampling from a non-differentiable distribution (such as a random variable). However, unlike the non-differentiable distribution, the confidence parameter 231 can be trained as part of a machine learning process. Substitution of a combination of the confidence parameter 231 and a sample from a distribution, such as a fixed distribution, for a sample from a non-differentiable distribution can be referred to as reparameterization.

An example method of reparameterization comprises combination of the confidence parameter 231 with a sample from a distribution from the "location-scale" family of distributions. In a particular embodiment, the distribution comprises a Laplace distribution. In such an embodiment, the differential privacy mechanism 230 can comprise a Laplace mechanism for local differential privacy. The Laplace mechanism can comprise scaled noise drawn from a Laplace distribution with a location parameter equal to 0 and a scale parameter equal to Δf/ε, where ε is a confidence parameter (e.g., 231) and Δf is the L2 sensitivity of the function, f, defined as:

$$\Delta_f = \max_{D,D'} \|f(D) - f(D')\|, \quad (1)$$

where D and D' are databases differing by at most one element. The confidence parameter ε can be a trainable variable. For example, ε can be iteratively tuned with gradient descent, such as by backpropagating a membership inference loss term. For example, the confidence parameter ε can become trainable within the context of a Laplace mechanism via reparameterization:

$$Z \sim \text{Lap}(0, \Delta f / \varepsilon) \rightarrow Z = \frac{\Delta f}{\varepsilon} \zeta, \text{ where } \zeta \sim \text{Lap}(0, 1), \quad (2)$$

where Lap(0, Δf/ε) stands for a Laplace distribution with location parameter equal to 0 and scale parameter equal to Δf/ε, Z represents samples from this aforementioned distribution, and ζ represents samples from a Laplace distribution with mean equal to 0 and variance equal to 1.

At 120, a classifier loss of a machine learning model is determined using the transformed training data, wherein the classifier loss comprises a class prediction loss and a membership inference loss. For example, the computing device 210 can determine a classifier loss 250 of a machine learning model 240 using the transformed training data generated by the differential privacy mechanism 230. The classifier loss 250 can be generated using a membership inference loss 251 and a class prediction loss 253.

In at least some embodiments, the machine learning model 240 can comprise a neural network. In such an embodiment, the differential privacy mechanism can comprise a layer of the neural network (such as an initial layer of the neural network).

The transformed training data can be provided to a classifier 241 of the machine learning model 240 to produce a class prediction for the transformed training data. An actual class for the training data 221 can be used in combination with the predicted class to produce the class prediction loss 253. In at least some embodiments, the class prediction can comprise a vector of predicted probabilities associated with possible classes to which the training data 221 may belong (and one of which is the actual class of the training data 221). In a different or further embodiment, the class prediction loss 253 can be determined using a categorical cross entropy with respect to the class prediction produced by the classifier 241 and the actual class for the training data 221.

The membership inference loss 251 indicates a level of vulnerability to a membership inference attack. In at least some embodiments, an adversary 260 can be used to generate the membership inference loss 251. For example, the transformed training data, class prediction generated by the classifier 241, and the actual class for the can be provided to the adversary 260. Based on the transformed training data and the predicted class, the adversary can generate a prediction (or inference) that a given record in the provided data is a member of the training data 221. The prediction can be used, in combination with the actual membership of the given record, to generate the membership inference loss 251. In at least some embodiments, the adversary can comprise an adversary inference model, that can be used to generate membership predictions for records in the transformed training data. The adversary inference model can comprise a machine learning model, such as a neural network. In a different or further embodiment, generating the membership inference loss 251 can comprise computing a sum of log probabilities that records in the transformed training data are members of the training data 221. By being based on both the class prediction loss 253 and the membership inference loss 251, the classifier loss 250 can represent a balance of classification accuracy (as represented by the class prediction loss) and differential privacy (as represented by the membership inference loss).

At 130, a classifier of the machine learning model is updated using the classifier loss. For example, the classifier 241 of the machine learning model 240 can be updated using the classifier loss 250. In an embodiment where the machine learning model comprises a neural network, updating the classifier 241 using the classifier loss 250 can comprise updating weights of nodes in one or more layers of the neural network. Updating the weights using the classifier loss can be performed as part of a backpropagation operation.

At 140, a confidence parameter of the differential privacy mechanism is updated using the classifier loss. For example, the confidence parameter 231 of the differential privacy mechanism 230 can be updated using the classifier loss 250. In embodiments where the differential privacy mechanism 230 comprises a layer of the neural network, updating the confidence parameter 231 can comprise updating the confidence parameter as part of a backpropagation of the neural network.

In at least some embodiments, the training and updating of the classifier and the confidence parameter of the differential privacy mechanism can be repeated multiple times until the classifier loss is less than a specified threshold or until a specified maximum number of iterations have been performed. Thus, in at least some cases, the training process can converge upon a differential privacy mechanism and classifier that represent a desired balance between classification accuracy and protection from membership inference attacks.

Example 5—Example Adversary Membership Inference Model Training

In any of the examples described herein, systems and methods can be provided for training membership inference models for use in performing membership inference predictions.

For example, the method 100 can optionally comprise training a membership inference model of an adversary (such as the adversary 260 depicted in FIG. 2). Any of the example systems described herein can be used to perform the training of the membership inference model. For example, the system 300, depicted in FIG. 3, can be used to perform such training.

Figure 3:
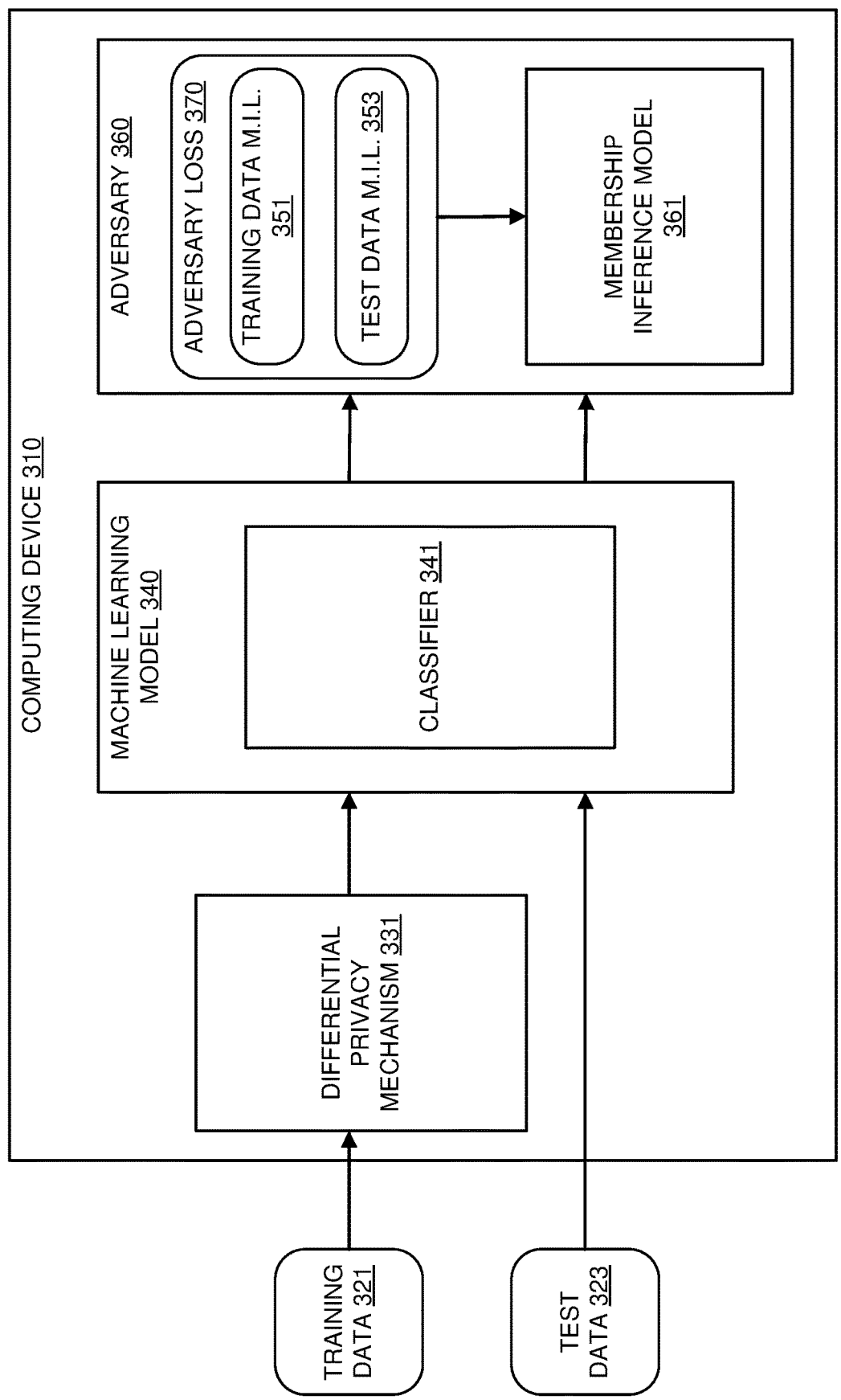
FIG. 3 is a system diagram depicting an example system for training an adversary membership inference model using a differential privacy mechanism.

FIG. 3. is a system diagram depicting the example system 300 for training an adversary membership inference model 361 using a differential privacy mechanism 331. The computing device 310 can comprise hardware (and optionally software components) configured to perform operations for training the membership inference model 361 of an adversary 360. The adversary membership inference model 361 can be trained using a prediction output of a classifier 341 of a machine learning model 340.

The training process can be repeated multiple times until the adversary loss 370 is below a specified threshold or a maximum number of iterations have been performed. After the membership inference model 361 has been trained, it can be used by the adversary 360 to provide membership predictions as part of a training of the machine learning model 340, as described herein.

In at least some embodiments, training the adversary membership inference model 361 comprises transforming training data 321 using a differential privacy mechanism 331 and using the transformed training data to generate a class prediction using a classifier 341 of the machine learning model 340. A first membership inference loss 351 can be determined by the adversary 360 based on the class prediction output the classifier 341 for the transformed training data.

A second membership inference loss 353 can then be determined based on a class prediction output of the classifier 341 for a test data set. The test data set 323 can be a data set that is not transformed by the differential privacy mechanism before it is provided to the classifier 341. In at least some embodiments, the training data 321 and the test data 323 can be disjoint data sets from a same sample population.

The first membership inference loss 351 can be determined based on the accuracy of predictions by the adversary 360 using the membership inference model 361 that records in the transformed training data are members of the training data 321. A similar process can be performed with the test data 323 to determine the second membership inference loss 353. An adversary loss 370 can be determined based on a combination of the first membership inference loss 351 and the second membership inference loss 353. In a particular embodiment, the adversary loss 370 comprises an average of the first membership inference loss 351 and the second membership inference loss 353.

The membership inference model 361 can then be updated using the adversary loss 370. In an embodiment where the membership inference model 361 comprises a neural network, updating the membership inference model 361 can comprise updating weights of the neural network using the adversary loss 370 through a technique such as backpropagation.

Example 6—Example Systems and Methods for Trainable Differential Privacy Using Source Prediction In any of the examples described herein, a generator can be provided for generating fake data that is used by a machine learning model to predict a source of the fake data. A source prediction loss based on source predictions made by the machine learning model can be used as a basis for a classifier loss (also referred to as a discriminator loss).

Fake data and an associated class label can be generated and provided as input to a machine learning model. The machine learning model can be configured to make a source prediction based on the data and associated label, wherein the source prediction indicates whether the data is authentic or fake. A source prediction loss can be determined based on the fake data and the associated class label. Such a source prediction loss can represent an accuracy of the machine learning model's source predictions.

In at least some embodiments, the fake data can be generated using a generative adversarial network. In such an embodiment, a generator loss can be determined using a combination of the source prediction loss and a class prediction loss that is also generated by the machine learning model. The generative adversarial neural network can be updated using the generator loss. For example, weights of the generative adversarial neural network can be updated using the generator loss using a technique such as backpropagation.

Figure 4:
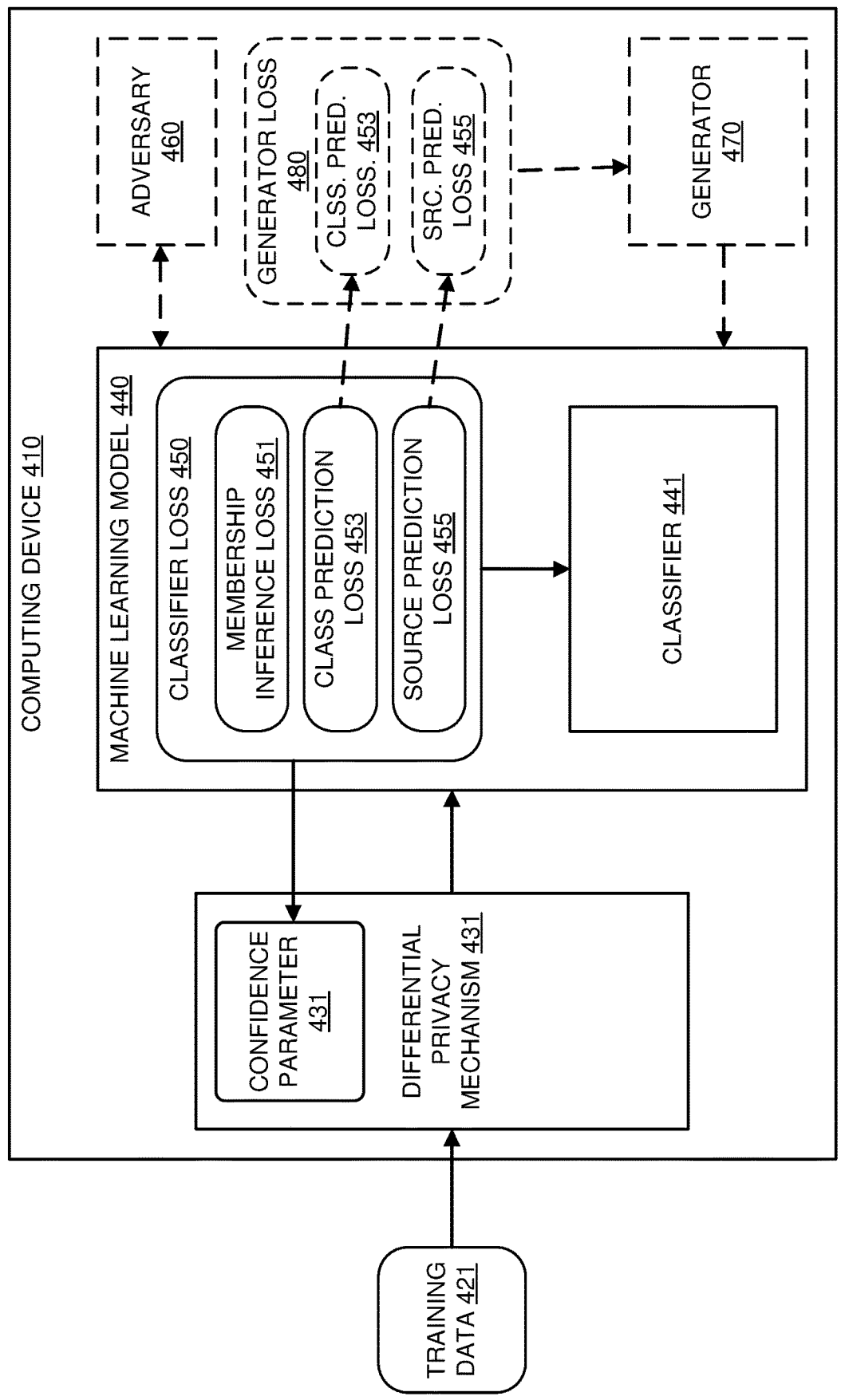
FIG. 4 is a system diagram depicting an example system for training a machine learning model using a differential privacy mechanism and source prediction.

FIG. 4 is a system diagram depicting an example system 400 for training a machine learning model 450 using a differential privacy mechanism 431 and source prediction. The example system 400 comprises a computing device 410 comprising hardware (and optionally software) components configured to perform operations as described herein.

Training data 421 can be received and transformed by a differential privacy mechanism 431 comprising a trainable confidence parameter 431. The transformed training data can be used to generate class predictions by a classifier 441 of a machine learning model 440. The class predictions and actual classes for the transformed training data can be used to generate a class prediction loss 453.

The class predictions, transformed data, and actual classes can also be used to generate membership predictions indicating whether records in the transformed training data are members of the training data 421. A membership inference loss 451 can be generated based on the accuracy of these prediction. In at least some embodiments, an adversary 460 can be used to generate the membership inference loss as described herein.

The machine learning model 440 can also make source predictions indicating whether records are authentic or fake. Fake data can be provided to the machine learning model 440 in order to train this aspect of the machine learning model. A source prediction loss 455 can be determined based on an accuracy of the source predictions. In at least some embodiments, the fake data and associated class labels can be generated by a generator 470. In at least some embodiments, the generator 470 can generate the fake data using a sampling of random noise. In a different or further embodiment, the generator 470 can comprise a machine learning model, such as a neural network. In some such embodiments, generator 470 and the machine learning model 440 can make up a generative adversarial network. The source prediction loss 455 and the class prediction loss 453 can be used to create a generator loss 480 that can be used to train the generator 470. For example, the generator loss 480 can be used update weights of the generator machine learning model by a technique such as backpropagation.

In at least some embodiments, the generator 470 does not have access to the transformed training data and is trained solely based on the source prediction loss 455 and class prediction loss 453. After the training is complete, the generator is able to produce new anonymized data that, in at least some cases, can be released without concerns about the data's privacy.

Example 7—Example Generative Adversarial Networks

In any of the examples described herein, a generative adversarial network can be used with a trainable differential privacy mechanism to generate differentially private data.

A generative adversarial network (GAN) can, when provided with a training data set, generate fake data that appears to come from a same population as records in the training data set. It is made up of two different neural networks: a generator neural network that generates fake records, and a discriminator neural network that attempts to determine whether given records are authentic or fake. The architectures of the two neural networks differ from one another depending on the application. In at least some embodiments, one or both of the generator and discriminator can comprise deep neural networks. The generator and discriminator can be trained using a loss function, for example by determining an accuracy of the predictions using a loss function and by backpropagating a source prediction loss to the parameters and updating the parameter weights of one or both of the generator and discriminator.

The generator can provide a mapping from random noise to new data samples that appear to come from a same underlying distribution as the authentic samples. The discriminator can attempt to distinguish the generated samples from the authentic ones by estimating a probability that a given sample comes from the training data, rather than the generator. By training these networks in an adversarial fashion, at each iteration of training, the generator can become better at producing realistic samples, while the discriminator can become better at distinguishing the authentic data from the generated data. The two networks thus compete against one another.

Example 8—Example Machine Learning Models

In any of the examples described herein, a machine learning model comprises one or more data structures generated by a machine learning process. Machine learning processes can comprise supervised learning processes, unsupervised learning processes, semi-supervised learning processes, or some combination thereof. Example machine learning models include artificial neural networks, decision trees, support vector machines, etc. A machine learning model can be generated by processing training records using a machine learning process. Training records can comprise one or more input fields (sometimes referred to as independent variables) and one or more output fields (sometimes referred to as dependent variables). A machine learning model can comprise a representation of one or more relationships generalized by a machine learning process based on the training records. In scenarios where it is determined that a plurality of data payloads are suitable for training a machine learning model, all or part of the plurality of data payloads can be used as training records to train the machine learning model. In at least some scenarios, it may be necessary to convert the plurality of data payloads to another data format that can be processed by a machine learning algorithm.

In any of the examples described herein, machine learning models, adversary membership inference models, and generators can comprise artificial neural networks.

An artificial neural network comprises a plurality of artificial neurons (also referred to as perceptrons or nodes) that can be configured to receive input, combine the input with an internal state (sometimes referred to as activation), and produce an output. In at least some embodiments, a neuron can be associated with an activation threshold which limits an activation of a neuron to scenarios where a given activation value rises above (or falls below) the given threshold. Initial inputs for an artificial neural network can comprise one or more data values. Example inputs can include digital representations of images, documents, data arrays, etc. An ultimate output of an artificial neural network comprises one or more values that represent a result. In at least some embodiments, an activation function can be provided which provides a smooth transition as input values change (e.g., a small change in input produces a small change in output).

The artificial neural network comprises edges (also referred to as connections). An edge connects two neurons and has a direction which identifies one of the neurons as an output neuron and the other neuron as an input neuron. If an activation function of the output neuron generates a value, the value is provided as an input value of the input neuron. An edge can be associated with a weight value that can represent a relative importance of the edge. In such an embodiment, the output value of the output neuron can be modified using the weight value before it is provided to the input neuron. A given neuron can have multiple input and/or output edges.

In at least some artificial neural networks, neurons are organized into multiple layers. Neurons of one layer can connect to neurons of an immediately preceding layer or an immediately following layer. The layer that receives external data as input values can be referred to as an input layer. A layer that produces an ultimate result can be referred to as an output layer. Zero or more layers of neurons can exist between the input layer and the output layer. These layers can be referred to as hidden layers. However, single-layer and unlayered networks are also possible. Various connection patterns can be used to connect the neurons of one layer to neurons of another layer. For example, the neurons of two layers can be fully connected, meaning that every neuron in one layer has edges connecting it to every neuron in the next layer. In another example, connection pools can be used, in which a group of neurons in one layer all have edges connecting to a single neuron in the next layer. In such embodiments, the number of neurons in the next layer can be reduced, thereby concentrating outputs from a larger number of neurons in the preceding layer into a smaller number of neurons in the following layer. Neurons with such connections form a directed acyclic graph and can be referred to as feedforward networks. Alternatively, networks can allow edges between nodes in a same layer and/or from neurons in one layer back to neurons in a preceding layer. Such networks can be referred to as recurrent networks.

An artificial neural network can be trained by adapting the artificial neural network based on sample observations.

Training can comprise adjusting weights of edges (and/or optional activation thresholds of neurons) to improve the accuracy of the results generated by the artificial neural network. This can be done by attempting to minimize observed errors. These observed errors can be referred to as losses. Various techniques, such as backpropagation, can be used to adjust weights of edges. Example approaches to weight adjustment include gradient descent. In at least some scenarios, training can be considered to be complete when examining additional observations does not usefully reduce an error rate (or loss) of the artificial neural network. However, even after an initial training phase, learning can still continue if new results and associated accuracy values cause an error rate of the artificial neural network to fall below a given threshold.

In at least some embodiments, weights can be adjusted based on feedback. Additionally or alternatively, additional input layer nodes and/or additional hidden layer nodes can be added to the artificial neural network in an attempt to increase accuracy in response to feedback.

Feedback data can be received from one or more client computing devices. For example, the feedback data can identify test scenarios which were correctly identified as successes and/or failures and/or test scenarios which were incorrectly identified as successes and/or failures. If errors in the feedback data cause the error rate of the artificial neural network to fall below an acceptable threshold, a computing device can use the feedback data (and optionally all or part of the initial training data) to re-train the artificial neural network; thereby generating an updated artificial neural network.

Various modes of training are possible. In at least some embodiments, each input creates one or more weights (and/or one or more activation thresholds) that are used to adjust the values transmitted from one neuron to another. For example, in an embodiment where input layer neurons are associated with data payload field values, weights can be used to change the values provided to connected neurons in a subsequent layer of the network.

Additionally or alternatively, weights (and/or activation thresholds) can be based on a batch of inputs. In at least some scenarios, stochastic learning modes can introduce noise. For example, by using a local gradient calculated from one data point, a chance that the artificial neural network will get stuck in a local minimum can be reduced. However, batch learning modes may yield a faster, more stable descent to a local minimum, since each update can be performed in a direction of the batch's average error. In at least some embodiments, a combination of both types of learning modes can be used.

Figure 5:
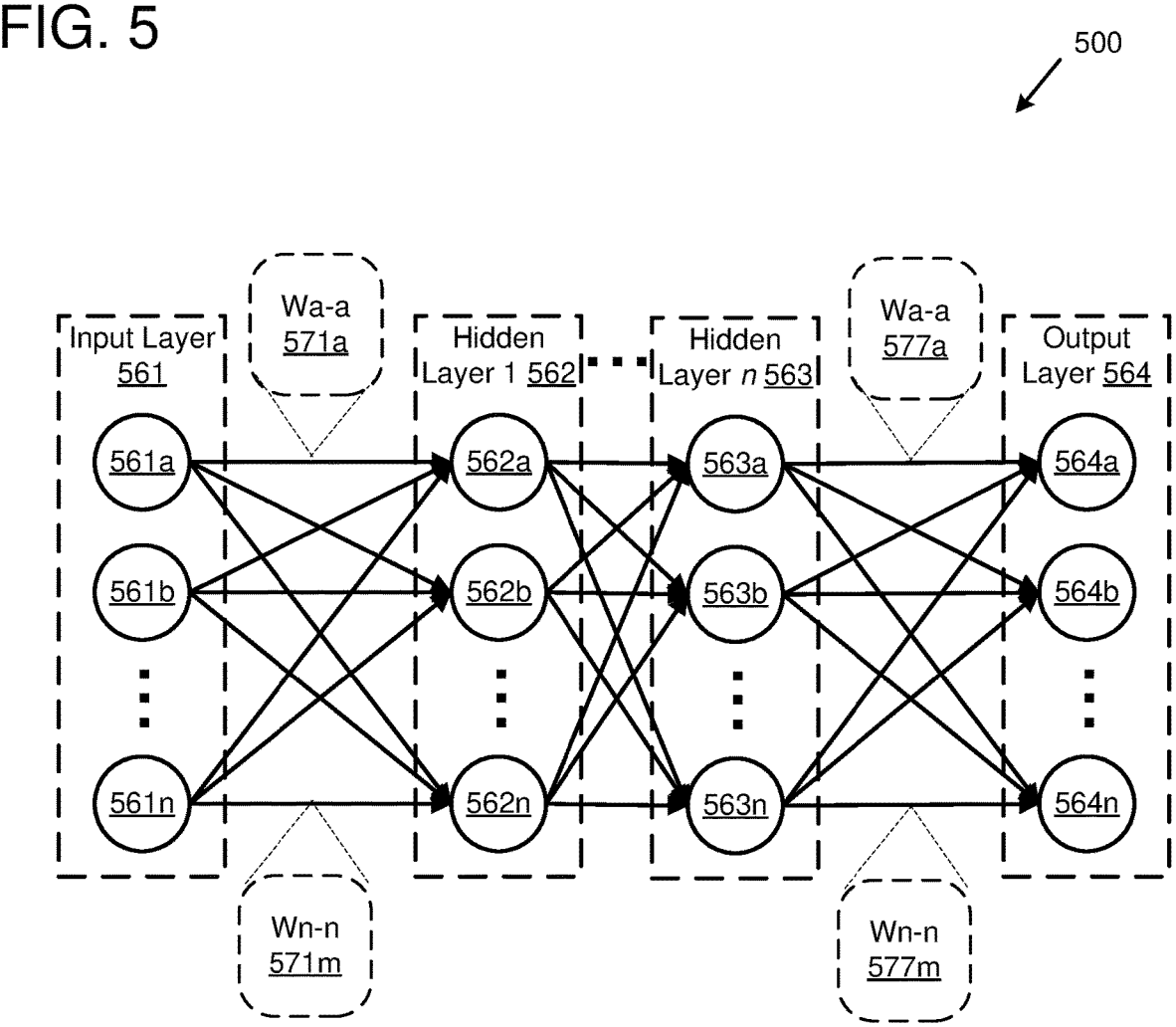
FIG. 5 is a diagram depicting an example artificial neural network.

FIG. 5 is a diagram depicting an example artificial neural network 500. The artificial neural network 500 can comprise a multilayer perceptron neural network. The neural network 500 may have an input layer 561, one or more hidden layers 562, 563, and an output layer 564. Each layer may have one or more nodes (or perceptrons). In at least some embodiments, the number of nodes at each layer is the same across the layers. Thus, the input layer 561 may have input nodes 561a, 561b, through 561n. Similarly, hidden layer 1 562 may have nodes 562a, 562b, though 562n, and so on through hidden layer n 563, which may have nodes 563a, 563b, through 563n. The output layer 564 may have nodes 564a, 564b, through 564n. However, layers with different numbers of nodes are also possible. A node may have one or more parameters, weights, coefficients, or other values, and one or more functions for the various inputs to that node.

The nodes of the artificial neural network 500 can be connected by edges with associated weights (e.g., 571a-571m and 577a-577m). For the sake of clarity, weights are not depicted for every edge depicted in FIG. 5. A weight can be used to modify an output value of a given node. The modified value can then be provided as input to another node. For example, an output of node 561a can be modified using weight 571a before the modified value is provided to node 562a as input.

The input layer 561 can accept an input vector to the neural network 500 and can begin neural network processing. (Although the neural network is referred to here as beginning the "processing," in at least some embodiments the artificial neural network 500 comprises a data structure representation of the neural network and associated executable code contains instructions for performing the processing of the input values through the neural network and producing the output values.) In some embodiments, the input layer 561 does not process the input vectors, other than any preprocessing necessary for the input vectors to be usable by the artificial neural network 500. In other embodiments, the input layer 561 may begin processing the input vectors using the functions and parameters at each node, similar to the hidden layers 562, 563.

The output of each layer can be the output of the various nodes at that layer. Further, nodes at a given layer can accept as input the output of one or more nodes at a preceding layer. For example, the output of input node 561a may be an input to one or more nodes in hidden layer 1 562, and so on for all the nodes in each successive layer. The output layer 564 may contain the final output values for the given input values in aggregate across its nodes 564a, 564b, through 564n. In this way, the artificial neural network 500 may be used to process input vectors through its various layers 561, 562, 563, 564, their respective nodes 561a-n, 562a-n, 563a-n, 564a-n, and their respective parameters and functions. In some embodiments, the layers 561, 562, 563, 564 may have varying numbers of nodes, while in other embodiments the layers may have the same number of nodes.

Figure 6:
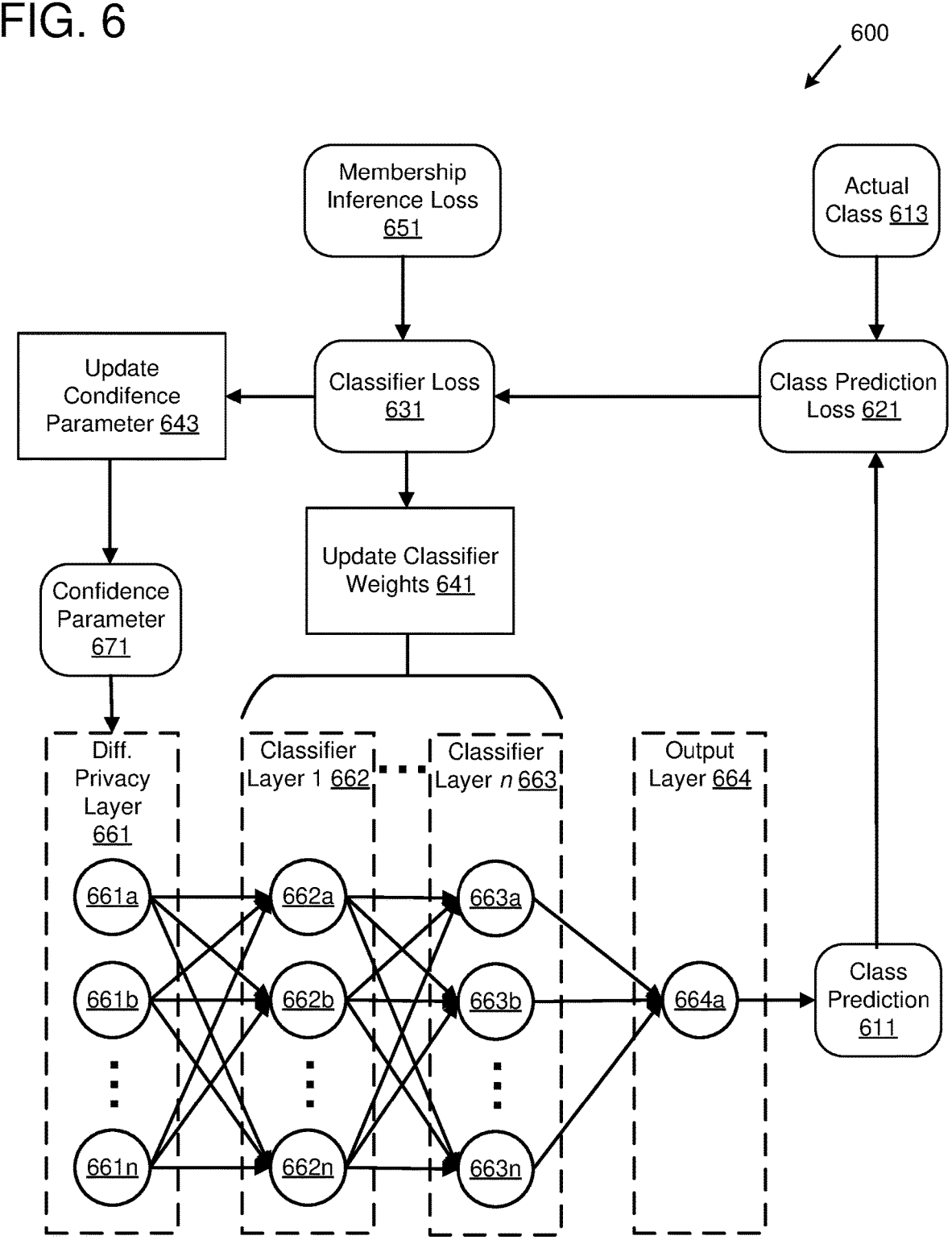
FIG. 6 is a diagram depicting an example artificial neural network comprising a differential privacy mechanism and a classifier.

FIG. 6 is a diagram depicting an example system 600 comprising artificial neural network comprising a differential privacy mechanism and a classifier. The artificial neural network comprises a differential privacy layer 661 of nodes 661a-n that receive an input vector from a training data set and transform the input vector using a differential privacy mechanism that comprises a trainable confidence parameter 671. The differential privacy mechanism can comprise a combination of the confidence parameter 671 and a sample from a differentiable distribution as described herein. The artificial neural network further comprises one or more classifier layers 662-663 comprising nodes 662a-n-663a-n, and an output layer 664, that produce a class prediction 611 based on the transformed input vector. Although the output layer 664 is depicted in FIG. 6 as comprising a single node 664a, other configurations are possible. For example, the output layer 664 can comprise multiple output nodes that produce predictions of membership in multiple classes (such as n output nodes that produce n probabilities that a given input vector is a member of n different classes).

The class prediction 611 and an actual class 613 associated with the input vector can be used to produce a class prediction loss 621 which reflects an accuracy of the prediction. The class prediction loss 621 can be combined with a membership inference loss 651 to produce a classifier loss 631 as described herein. For example, the input vector, class prediction 611, and actual class 613 can be provided to an adversary that generates the membership inference loss 651.

The classifier loss 631 can then be used to update classifier weights 641 in the one or more classifier layers 662-663, and to update the confidence parameter 671. The updated confidence parameter and weights can then be used in subsequent training iterations.

Example 9—Example Computing Systems

Figure 7:
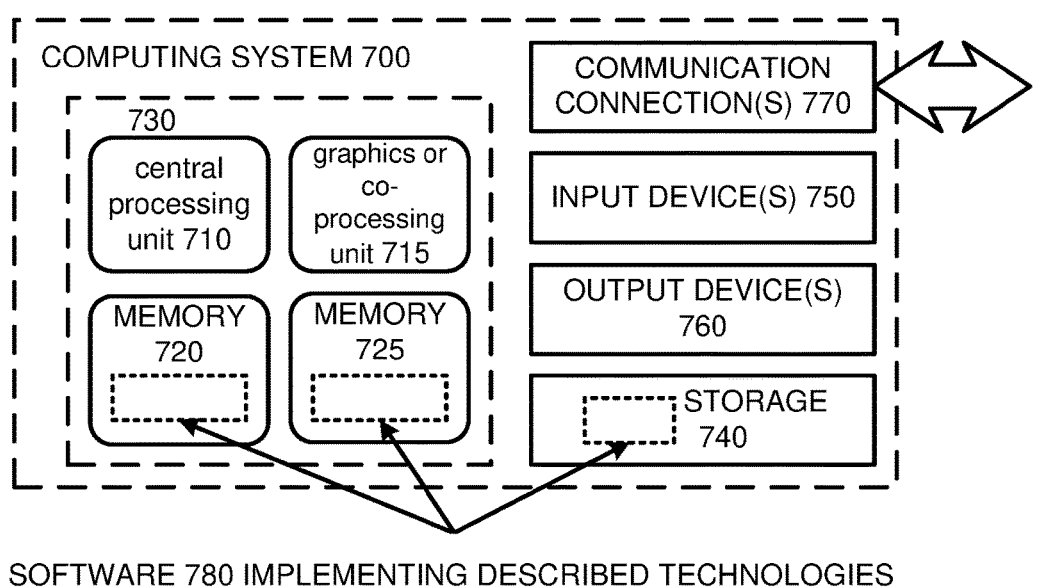
FIG. 7 is a block diagram of an example computing system in which some described embodiments can be implemented.

FIG. 7 depicts a generalized example of a suitable computing system 700 in which the described innovations may be implemented. For example, the computing system 700 can be used as a computing device as described herein. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, solid state drives, etc.), or some combination of the two, accessible by the processing unit(s). The memory 720, 725 can store software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, solid state drives, CD-ROMs, DVDs, or any other medium which can be used to store information in a non-transitory way and which can be accessed within the computing system 700. The storage 740 can store instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Example embodiments can comprise computer-executable instructions, such as those included in program modules, being executed in a computing system by one or more processors. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine," "generate," and "use" to describe computer operations in a computing system. These terms are high-level abstractions for operations performed by a computer, and should not be confused with acts performed by a human being. The actual computer operations corresponding to these terms vary depending on implementation.

Example 10—Example Cloud Computing Environment

Figure 8:
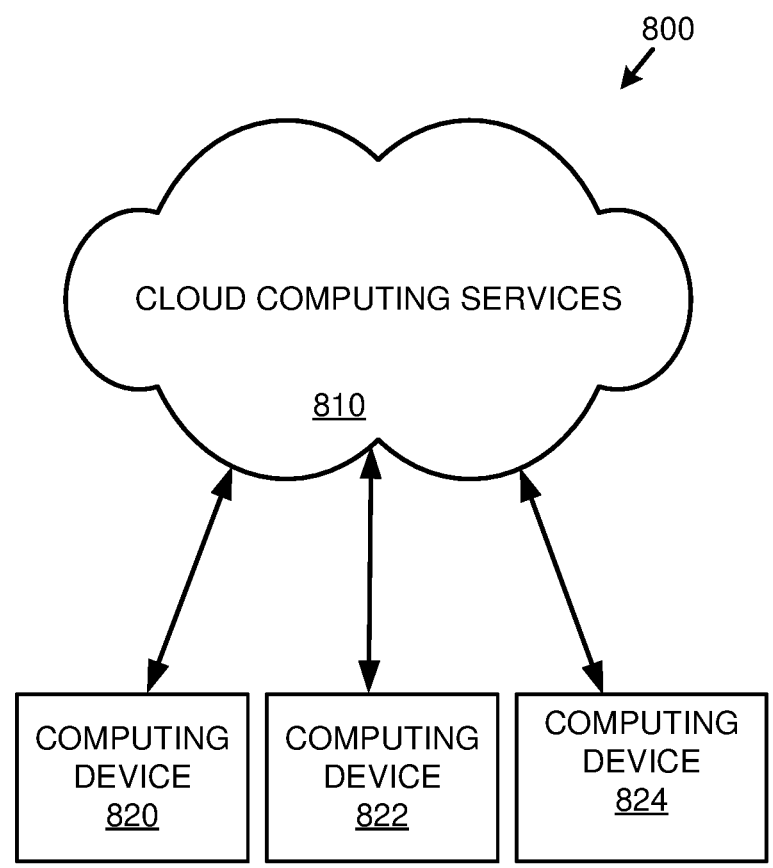
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. For example, one or more computer servers of the cloud computing services 810 can be used as a server as described herein. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices and server computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like). One or more of the computing devices can be embedded devices that comprise integrated circuits (such as Internet of Things (IoT) devices, etc.).

Example 11—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Python, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A computer-implemented method, comprising:
   iteratively training a machine learning model using a computing device comprising one or more processors and one or more memories storing instructions that, when executed by the one or more processors, cause the computing device to perform operations comprising, for each iteration:
   transforming training data into transformed training data using a differential privacy mechanism;
   determining a classifier loss of the machine learning model using the transformed training data, wherein determining the classifier loss comprises:
   generating a class prediction loss using a classifier of the machine learning model based on a predicted class for the transformed training data produced by the classifier and an actual class for the training data;
   generating a membership inference loss using an adversary membership inference model based on an inference produced by the adversary membership inference model that a given record in the transformed training data is a member of the training data and an actual membership of the given record; and
   combining the class prediction loss and the membership inference loss to generate the classifier loss;
   training the adversary membership inference model, comprising:
   determining a first membership inference loss based on class prediction output of the classifier for the transformed training data;
   determining a second membership inference loss based on class prediction output of the classifier for a test data set; and
   determining an adversary loss based on a combination of the first membership inference loss and the second membership inference loss;
   updating the classifier of the machine learning model using the classifier loss; and
   updating a confidence parameter of the differential privacy mechanism using the classifier loss, wherein the confidence parameter defines a privacy budget for transforming the training data into the transformed training data,
   wherein the iterative training continues until the classifier loss is less than a specified threshold or a specified maximum number of iterations has been performed.

2. The computer-implemented method of claim 1, wherein the machine learning model comprises a neural network, the differential privacy mechanism comprises a layer of the neural network, and the classifier comprises another one or more layers of the neural network.

3. The computer-implemented method of claim 2, wherein using the classifier loss to update a confidence parameter of the differential privacy mechanism comprises updating the confidence parameter as part of a backpropagation of the neural network.

4. The computer-implemented method of claim 1, wherein transforming the training data comprises combining the confidence parameter with a sample from a Laplace distribution.

5. The computer-implemented method of claim 1, wherein training the adversary membership inference model further comprises:
updating the adversary membership inference model using the adversary loss.

6. The computer-implemented method of claim 5, wherein:
the adversary membership inference model comprises a neural network; and
updating the adversary membership inference model comprises using backpropagation to update weights of the neural network using the adversary loss.

7. The computer-implemented method of claim 1, further comprising:
generating fake data and an associated class label; and
determining a source prediction loss of the machine learning model based on the fake data and the associated class label;
wherein determining the classifier loss comprises combining the class prediction loss, the membership inference loss, and the source prediction loss.

8. The computer-implemented method of claim 7, wherein:
the fake data is generated using a generative adversarial neural network; and
the method further comprises:
determining a generator loss using a combination of the source prediction loss and the class prediction loss; and
updating the generative adversarial neural network using the generator loss, wherein
the updating comprises using backpropagation to update weights of the generative adversarial neural network using the generator loss.

9. A system, comprising a computing device comprising one or more processors and one or more memories storing instructions that, when executed by the one or more processors, cause the computing device to perform operations, the operations comprising:
receiving training data; and
iteratively training a machine learning model, the iteratively training comprising, for each iteration:
transforming the training data into transformed training data using a differential privacy mechanism;
determining a classifier loss for a machine learning model using the transformed training data, wherein determining the classifier loss comprises:
generating a class prediction loss using a classifier of the machine learning model based on a predicted class for the transformed training data produced by the classifier and an actual class for the training data;
generating a membership inference loss using an adversary membership inference model based on an inference produced by the adversary membership inference model that a given record in the transformed training data is a member of the training data and an actual membership of the given record; and
combining the class prediction loss and the membership inference loss to generate the classifier loss;
training the adversary membership inference model, comprising:
determining a first membership inference loss based on class prediction output of the classifier for the transformed training data;
determining a second membership inference loss based on class prediction output of the classifier for a test data set; and
determining an adversary loss based on a combination of the first membership inference loss and the second membership inference loss;
using the classifier loss to update the classifier of the machine learning model; and
using the classifier loss to update a confidence parameter of the differential privacy mechanism, wherein the confidence parameter defines a privacy budget for transforming the training data into the transformed training data,
wherein the iterative training continues until the classifier loss is less than a specified threshold or a specified maximum number of iterations has been performed.

10. The system of claim 9, wherein the machine learning model comprises a neural network, the differential privacy mechanism comprises a layer of the neural network, and the classifier comprises another one or more layers of the neural network.

11. The system of claim 10, wherein using the classifier loss to update a confidence parameter of the differential privacy mechanism comprises updating the confidence parameter as part of a backpropagation of the neural network.

12. The system of claim 11, wherein transforming the training data comprises combining the confidence parameter with a sample from a Laplace distribution.

13. The system of claim 9, wherein training the adversary membership inference model further comprises:
updating the adversary membership inference model using the adversary loss.

14. The system of claim 9, wherein the operations further comprise:
generating fake data and an associated class label; and
determining a source prediction loss of the machine learning model based on the fake data and the associated class label;
wherein determining the classifier loss comprises combining the class prediction loss, the membership inference loss, and the source prediction loss.

15. The system of claim 14, wherein:
the fake data is generated using a generative adversarial neural network; and
the operations further comprise:
determining a generator loss using a combination of the source prediction loss and the class prediction loss; and
updating the generative adversarial neural network using the generator loss, wherein
the updating comprises using backpropagation to update weights of the generative adversarial neural network using the generator loss.

16. One or more non-transitory computer-readable storage media storing instructions that, when executed by one or more processors, cause the one or more processors to perform operations, the operations comprising:
iteratively training a machine learning model, wherein the machine learning model comprises a neural network, and iteratively training the machine learning model comprises, for each iteration:
transforming training data into transformed training data using a differential privacy mechanism, wherein the differential privacy mechanism comprises a layer of the neural network and transforming the training data comprises combining a confidence parameter with a sample from a Laplace distribution, wherein the confidence parameter defines a privacy budget for transforming the training data into the transformed training data;

determining a classifier loss of the machine learning model using the transformed training data, wherein determining the classifier loss comprises:

generating a class prediction loss using a classifier of the machine learning model based on a predicted class for the transformed training data produced by the classifier and an actual class for the training data;

generating a membership inference loss using an adversary membership inference model based on an inference produced by the adversary membership inference model that a given record in the transformed training data is a member of the training data and an actual membership of the given record; and combining the class prediction loss and the membership inference loss to generate the classifier loss;

training the adversary membership inference model, comprising:

determining a first membership inference loss based on class prediction output of the classifier for the transformed training data;

determining a second membership inference loss based on class prediction output of the classifier for a test data set; and determining an adversary loss based on a combination of the first membership inference loss and the second membership inference loss;

updating the classifier of the machine learning model using the classifier loss, wherein the classifier comprises another one or more layers of the neural network; and updating the confidence parameter of the differential privacy mechanism using the classifier loss, wherein the updating comprises performing a backpropagation of the neural network, wherein the iterative training continues until the classifier loss is less than a specified threshold or a specified maximum number of iterations has been performed.

17. The one or more computer-readable storage media of claim 16, wherein training the adversary membership inference model further comprises: updating the adversary membership inference model using the adversary loss.

18. The one or more computer-readable storage media of claim 17, wherein: the adversary membership inference model comprises a second neural network; and updating the adversary membership inference model comprises using backpropagation to update weights of the second neural network using the adversary loss.

* * * * *